United States Patent
Barkie et al.

(10) Patent No.: US 9,733,922 B2
(45) Date of Patent: Aug. 15, 2017

(54) SMARTER OPERATING SYSTEMS: FILE SYSTEM EVENTS

(71) Applicant: International Business Machines Corporation, Armonk, NY (US)

(72) Inventors: Eric J. Barkie, Cary, NC (US); Benjamin L. Fletcher, Denver, CO (US); Andrew P. Wyskida, Fishkill, NY (US)

(73) Assignee: International Business Machines Corporation, Armonk, NY (US)

( * ) Notice: Subject to any disclaimer, the term of this patent is extended or adjusted under 35 U.S.C. 154(b) by 8 days.

(21) Appl. No.: 14/791,529

(22) Filed: Jul. 6, 2015

(65) Prior Publication Data

US 2017/0010878 A1    Jan. 12, 2017

(51) Int. Cl.
*G06F 9/445* (2006.01)

(52) U.S. Cl.
CPC ...................... *G06F 8/65* (2013.01)

(58) Field of Classification Search
CPC ........................................................ G06F 8/65
USPC .................. 717/168–176; 709/203
See application file for complete search history.

(56) References Cited

U.S. PATENT DOCUMENTS

| | | | | |
|---|---|---|---|---|
| 6,138,249 A * | 10/2000 | Nolet | ............. | G06F 11/008 714/25 |
| 6,379,153 B1 * | 4/2002 | Schroering | .......... | A61C 8/0012 433/173 |
| 6,698,018 B1 * | 2/2004 | Zimniewicz | ............. | G06F 8/61 717/169 |
| 6,832,373 B2 * | 12/2004 | O'Neill | ..... | G06F 8/65 714/25 |
| 7,162,628 B2 * | 1/2007 | Gentil | ......... | G06F 9/4451 709/220 |
| 7,185,071 B2 * | 2/2007 | Berg | ........ | G06F 8/61 709/220 |

(Continued)

FOREIGN PATENT DOCUMENTS

| | | |
|---|---|---|
| CA | 2386293 A1 | 4/2001 |
| CN | 103746782 | 4/2014 |

(Continued)

OTHER PUBLICATIONS

Alpern et al, "PDS: A Virtual Execution Environment for Software Deployment ", ACM, pp. 175-185, 2005.*

(Continued)

*Primary Examiner* — Anil Khatri
(74) *Attorney, Agent, or Firm* — Scully, Scott, Murphy & Presser, P.C.; Louis J. Percello, Esq.

(57) ABSTRACT

An on device client that augments operating system functionality may monitor for an event from an operating system running on a processor of a device. Responsive to determining that the event is indicative of an installation of an application on the device, the on device client may generate a table associated with the application. The table comprises locations of file system entities associated with the application. The table is stored in a memory device. Responsive to determining that the event is indicative of a modification to the application installed on the device, the on device client may trigger one or more automatic processor actions to keep the modification consistent across the file system entities of the application.

17 Claims, 3 Drawing Sheets

(56) References Cited

U.S. PATENT DOCUMENTS

| | | | | |
|---|---|---|---|---|
| 7,328,234 | B1* | 2/2008 | Nedbal | G06F 9/44505 709/202 |
| 7,340,737 | B2* | 3/2008 | Ghercioiu | G06F 8/60 709/216 |
| 7,451,441 | B2* | 11/2008 | Carter | G06F 8/61 717/174 |
| 7,546,594 | B2* | 6/2009 | McGuire | G06F 8/68 717/168 |
| 7,584,470 | B2* | 9/2009 | Barker | G06F 8/61 717/168 |
| 7,644,392 | B2 | 1/2010 | Geipel et al. | |
| 7,788,227 | B1* | 8/2010 | Nettleton | G06F 9/541 707/640 |
| 7,904,194 | B2* | 3/2011 | Brown | G05B 19/408 700/174 |
| 8,006,241 | B2* | 8/2011 | Dias | G06F 8/61 717/173 |
| 8,095,923 | B2* | 1/2012 | Harvey | G06F 8/36 717/103 |
| 8,244,856 | B2* | 8/2012 | Appleton | H04L 41/069 709/217 |
| 8,402,472 | B2* | 3/2013 | Appleton | H04L 41/024 719/313 |
| 8,448,162 | B2* | 5/2013 | Ramanathan | G06F 8/65 717/171 |
| 8,565,746 | B2* | 10/2013 | Hoffman | H04M 3/2227 370/241 |
| 8,601,170 | B1* | 12/2013 | Marr | G06F 21/572 710/15 |
| 9,317,686 | B1* | 4/2016 | Ye | G06F 21/56 |
| 2014/0304354 | A1 | 10/2014 | Chauhan et al. | |
| 2014/0337746 | A1 | 11/2014 | Chang et al. | |
| 2015/0089042 | A1 | 3/2015 | Repperger | |

FOREIGN PATENT DOCUMENTS

| | | |
|---|---|---|
| CN | 104333542 | 2/2015 |
| KR | 20140110486 | 9/2014 |
| WO | 0124059 A2 | 4/2001 |
| WO | 2004031958 A1 | 4/2004 |

OTHER PUBLICATIONS

Silberschat, "Serializability in Multi-Level Monitor Environments", ACM, pp. 855-861, 1978.*

Herrick et al, "Sustainable Automated Software Deployment Practices", ACM, pp. 189-196, 2013.*

Heiner et al, "Secure Software Installation in a Mobile Environment", ACM, pp. 155-156, 2007.*

Aasbakken et al, "30, 2012Evaluation of User Engagement and Message Comprehension in a Pervasive Software Installation", IEEE, pp. 27-30, 2012.*

Belguidoum et al, "Analysis of deployment dependencies in software components", ACM, pp. 735-736, 2006.*

Vouillon et al, "On Software Component Co-Installability", ACM, pp. 256-266, 2011.*

"Application ID on the file system" IP.com No. IPCOM000216475D, An IP.com Prior Art Database Technical Disclosure (Apr. 2012) pp. 1-5.

Hess, C. K et al., "An application of a context-aware file system" Personal and Ubiquitous Computing (Dec. 2003) pp. 339-352, vol. 7, No. 6.

Schandl, B. et al., "Lifting File Systems into the Linked Data Cloud with TripFS" In LDOW (Apr. 2010) pp. 1-8.

Macdonell, A. Cameron, "Trigger Scripts for Extensible File Systems" Thesis, University of Alberta (Oct. 2002), 18 pages.

* cited by examiner

SMARTER OPERATING SYSTEMS: FILE SYSTEM EVENTS

FIELD

The present application relates generally to computers and computer applications, and more particularly to computer operating system and file system events.

BACKGROUND

A computer application usually includes files, directories, icons, graphical user interface (GUI) objects, and log files. Problems can arise when a user modifies one or more of these objects explicitly, e.g., without conforming the other objects to the modification, thereby breaking the functionality of the application and preventing it from operating as intended. Examples of modifications to application objects that could render an application unusable include: objects deleted to a trash folder or recycle bin or like, objects modified from their expected state, objects overwritten by the user, and objects renamed by the user.

An operating system sometimes seeks to prevent these damaging modifications by issuing a warning to the user to confirm the operation (e.g., "rm file"; "rm: Remove file? y"). But typically there is not a check to see if the object modification will render an application(s) unusable.

Additionally, applications often dynamically create resource files and save them locally to the computer. These additional resources can be installed at virtually any location on the computer at the discretion of the application developer. Should a user want to move, copy, or delete the application, the dynamically created resource files are often not accounted for and are not moved, copied, or deleted, along with other objects of the application. Such inconsistencies or partial moves or deletes of application objects can break the functionality of the application. Unmoved objects that are no longer functioning correctly can also take up system memory.

BRIEF SUMMARY

A method and system of an on device client that augments operating system functionality may be provided. The method, in one aspect, may comprise monitoring for an event from an operating system running on a processor of a device. The method may also comprise, responsive to determining that the event is indicative of an installation of an application on the device, generating a table associated with the application, the table comprising locations of file system entities associated with the application, and storing the table in a memory device. The method may also comprise, responsive to determining that the event is indicative of a modification to the application installed on the device, triggering one or more automatic processor actions to keep the modification consistent across the file system entities of the application.

A system for an on device client that augments operating system functionality, in one aspect, may comprise a device comprising at least a processor and a memory. The processor may be operable run a background process to monitor for an event from an operating system running on the device. Responsive to determining that the event is indicative of an installation of an application on the device, the processor may be further operable to generate a table associated with the application, the table comprising locations of file system entities associated with the application, the processor further operable to store the table in the memory. Responsive to determining that the event is indicative of a modification to the application installed on the device, the processor may be further operable to trigger one or more automatic processor actions to keep the modification consistent across the file system entities of the application.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
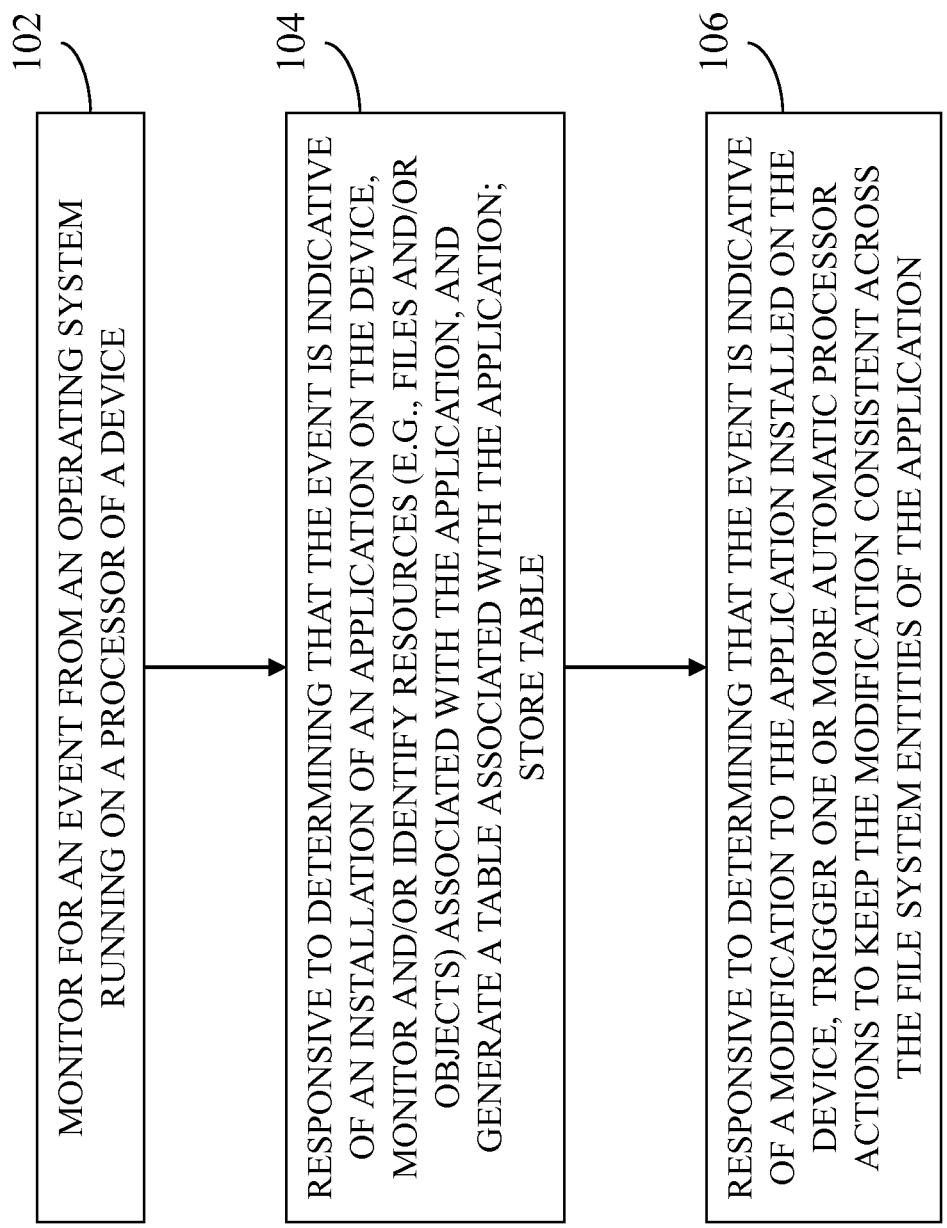
FIG. 1 is a flow diagram illustrating a method of an on device client that augments operating system functionality, in one embodiment of the present disclosure.

A method, system, and/or techniques are presented that monitor application resources on a computer as they are created, copied deleted, and/or moved. The resources are associated with the application. After a user issues an application file or object modification operation or command such as copy, move, or delete an application file, and after the operating system responds to the request, a method in one embodiment of the present disclosure in one embodiment also responds to ensure that all application resources have been copied, moved, or deleted.

For example, an on device client (ODC) may run in the background in a computer system, monitoring file or object activity using an operating system (OS) standard application programming interfaces (APIs). Examples of such standard APIs may include, but are not limited to, Directory Management Functions (e.g., FindFirstChangeNotification) on Win32™ Operating System, FSEvents API on Mac™ Operating System, and inotify, dnotify, fschange on Linux™ Operating System. In one embodiment of the present disclosure, on file change, an OS standard event is triggered in the ODC.

For instance, application file events may include one or more of the following events: installation or deployment of a new app or application; addition, deletion, modification of an application's dynamic resources. The ODC of the present disclosure in one embodiment, in response to detecting an event that indicates an installation of an application, may catalog application resources that are installed and associate them with the application. For instance, a table may be generated that includes a list of resources associated with the application, and stored in a memory device. The table is associated with the installed application.

The ODC of the present disclosure in one embodiment, responsive to detecting an event that indicates one or more of addition, deletion, or modification of an application's dynamic resources, catalog new files (or objects) and/or changes to existing one or more files or objects. For example, a table comprising a list or resources associated with the application is accessed and updated with the changes detected by the event.

ODC in one embodiment of the present disclosure also monitors for user invoked application file events. Examples of user invoked application file events may include, but are not limited to, copying an application (e.g., one or more files or objects associated with the application), moving an application (e.g., one or more files or objects associated with the application), and/or deleting an application (e.g., one or more files or objects associated with the application). The ODC in one embodiment of the present disclosure monitors the OS copy operation, and responsive to detecting an event that indicates a copying of an application, the ODC in one embodiment of the present disclosure also copies additional missing files accordingly. For instance, ODC may determine the files and objects that should also have been copied with the detected copy operation, and performs the copying of the rest of the files and objects.

Similarly, the ODC in one embodiment of the present disclosure monitors the OS move operation, and responsive to detecting an event that indicates a move of an application, the ODC in one embodiment of the present disclosure also moves additional missing files accordingly. For instance, ODC may determine the files and objects that should also have been moved with the detected move operation, and performs the moving of the rest of the files and objects.

The ODC in one embodiment of the present disclosure monitors the OS operation that removes one or more files or objects, and responsive to detecting an event that indicates a removal of an application, the ODC in one embodiment of the present disclosure also removes files that are left behind. For instance, ODC may determine the files and objects that should also have been removed with the detected remove operation, and performs the removing of the rest of the files and objects.

FIG. 1 is a flow diagram illustrating a method of an on device client that augments operating system functionality, in one embodiment of the present disclosure. At 102, the method one embodiment may include monitoring for an event from an operating system running on a processor of a device. For instance, an ODC, an executable computer program, may be installed on a user endpoint or device and run as a background process. The ODC, for example, using OS standard APIs, may monitor file activities associated with an application on the user device.

For instance, OS Standard APIs may trigger an "event" in ODC on a change to a directory that is being monitored. On a new application install, ODC may monitor resource installation and store locations, e.g., directory locations, where resources are installed. For instance, at 104, responsive to determining that the event is indicative of an installation of an application on the device, ODC may monitor and/or identify resources (e.g., files and/or objects) associated with the application, and generate a table associated with the application. The table, in one embodiment, contains or includes locations, e.g., directory locations, of file system entities (also referred to as resources) associated with the application. The table may be stored in a memory device. The table may be stored locally on the device, remotely for example on a web server or another server, or on a cloud platform. If the table is stored remotely, the table may be accessed via remote methods, for example, web interfaces (e.g., Representational State Transfer (REST) interface) or another.

The ODC also may monitor for modifications to the application resources. At 106, responsive to determining that the event is indicative of a modification to the application installed on the device, the ODC may trigger one or more automatic processor actions to keep the modification consistent across the file system entities of the application.

The modification to the application may be user invoked or application invoked. For instance, the application installed on the device may make modifications to the resources, for instance, as new resources are added and/or old resources are changed. As another example, a user may make a modification, for example, via operating system command or the like such as "copy", "move", or "delete."

The ODC may monitor the local locations, e.g., directory locations, of file-system entities for changes and update the table to reflect the changes. For example, OS Standard APIs may trigger an "event" in ODC on a change to a directory that is being monitored. The ODC may also monitor for specific operating system events that modify the application.

The triggering of one or more automatic processor actions may include accessing the table and determining which one or more of the file system entities remain unmodified after the modification to the application, and performing the modification on the one or more of the file system entities determined to remain unmodified. For example, the table may be referenced or accessed for a list of file-system entities that are affected by the event. An action may be performed to ensure that the event is reflected in all of the file-system entities. For instance, when an OS modification "event" is triggered in ODC (e.g., copy app, move app, delete app), ODC facilitates resource location changes to ensure all associated resources are copied, moved, or deleted.

In another aspect, the triggering of one or more automatic processor actions may include obtaining one or more rules for handling the event indicative of a modification to the application, and executing the one or more rules. For example, when an OS modification "event" is triggered in ODC (e.g., copy app, move app, delete app), ODC looks up resource handling rules reference associated the application. Resource handling rules reference may be stored, for example, on a web server, a cloud platform, and/or a local database on the device. For instance, rules for handling application modification events may be stored in a service (e.g., web, cloud, or locally). ODC may request event handling rules via interface to service and the service may return the one or more rules. In one aspect, the rules may be configurable, for example, added by a user or an individual, and/or socially via a social networking application or site.

Figure 2:
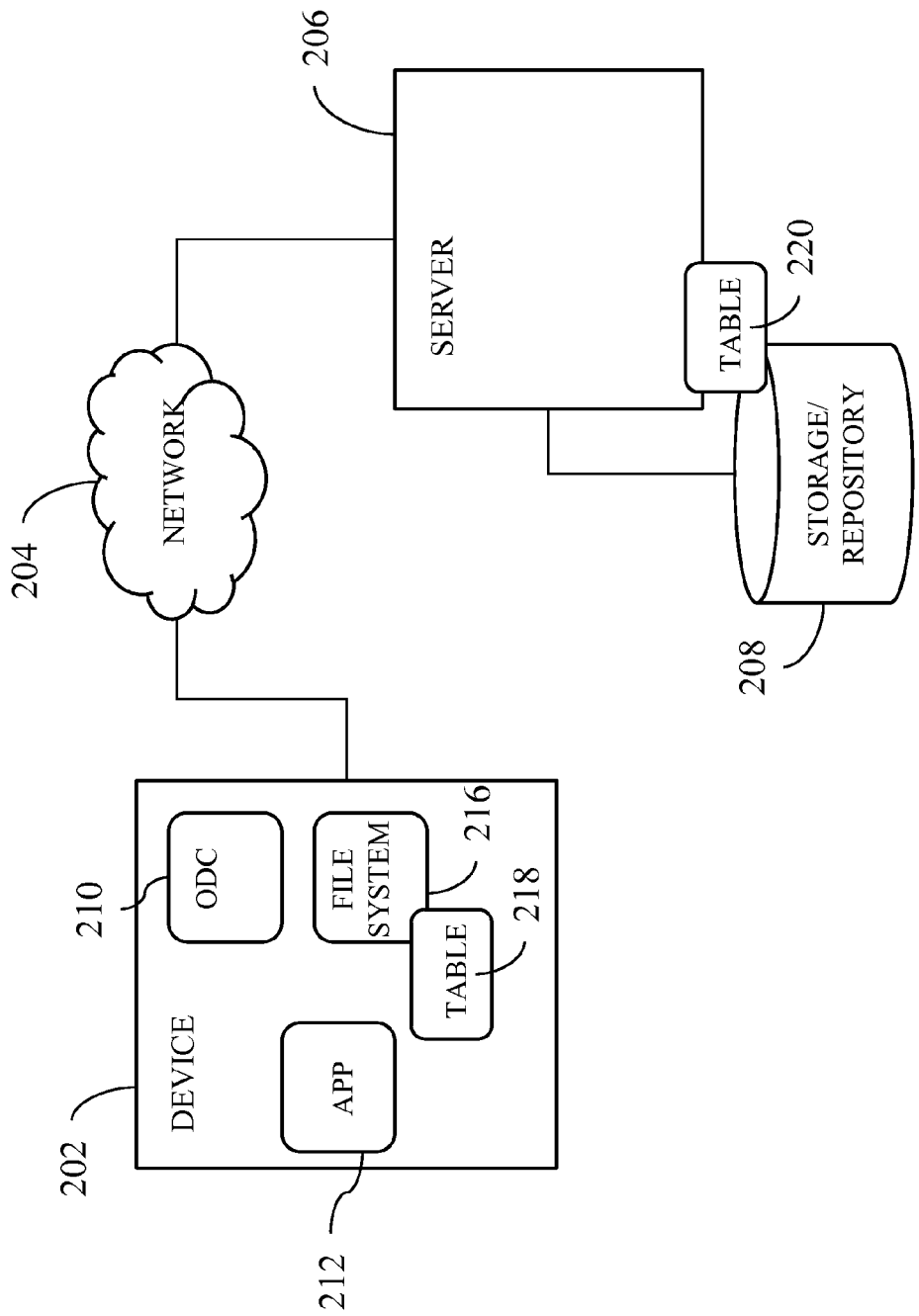
FIG. 2 is a diagram showing components of a system that may augment operating system functionality, in one embodiment of the present disclosure.

FIG. 2 is a diagram showing components of a system that may augment operating system functionality, in one embodiment of the present disclosure. A device 202 may be a user device such as a desktop computer, a laptop computer, or another computer device. The device 202, for example, may include one or more processors and a memory device. The device 202 may be coupled via network 204 to a server 206 that may provide services such as a web service. The server 204 may be coupled to a storage device 208. The device 202 may include an ODC functionality 210 that runs as a background process and monitor the activities occurring on the device 202 such as an installation of an application (e.g., 212). The device 202 may also include a file system 216, for example, stored on a memory device coupled to the device. The file system 216 may include the application files or objects associated with the app 212. The ODC 210 may perform the functionalities described above with reference to FIG. 1. In one aspect, the ODC 210 may generate a table 218 that contains the information associated with the application's file system entities, and store the table 218 on the device locally. In another aspect, the table may be stored remotely with a server device, e.g., as shown at 220. Still yet, the table may be stored both on the device 202 and on the server 206, e.g., on a repository 208 coupled to the server, redundantly.

Figure 3:
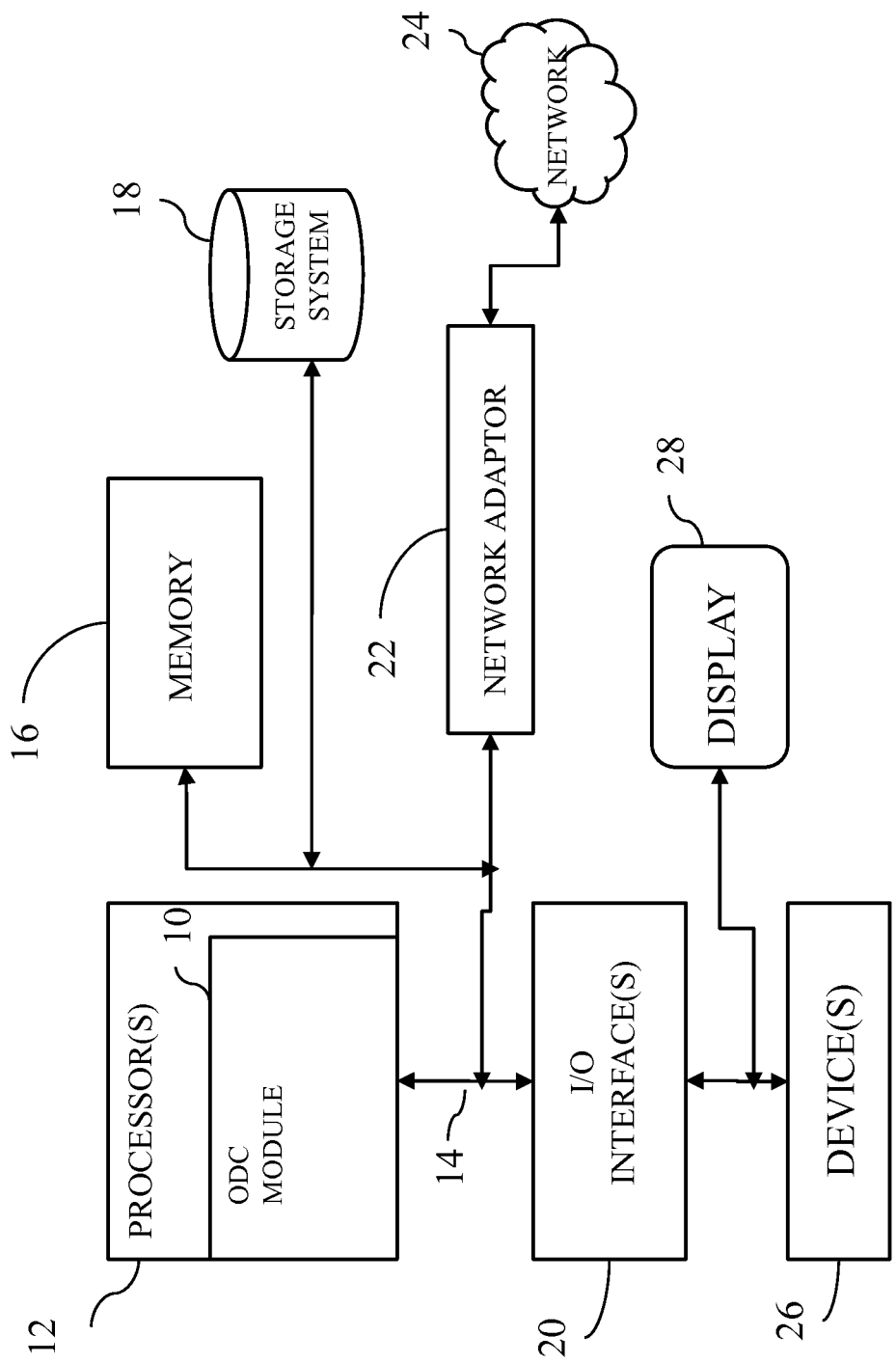
FIG. 3 illustrates a schematic of an example computer or processing system that may implement a system that augments operating system functionality in one embodiment of the present disclosure.

FIG. 3 illustrates a schematic of an example computer or processing system that may implement a system that augments operating system functionality in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 3 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include an on device client module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method of an on device client that augments operating system functionality, comprising:
monitoring for an event from an operating system running on a processor of a device;
responsive to determining that the event is indicative of an installation of an application on the device,
generating a table associated with the application, the table comprising locations of file system entities associated with the application, and storing the table in a memory device, the file system entities comprising files associated with the application, the files being components of the application needed for the application to operate as intended; and
responsive to determining that the event is indicative of a modification to the application installed on the device, triggering one or more automatic processor actions to keep the modification consistent across the file system entities of the application, wherein responsive to determining that the event is a copy operation on the application, the one or more automatic processor actions comprises detecting, based on entries in the table, one or more of the file system entities that are missing in the copy operation and performing copying of the one or more of the file system entities that are missing in the copy operation, wherein responsive to determining that the event is a move operation on the application, the one or more automatic processor actions comprises detecting, based on the entries in the table, one or more of the file system entities that are missing in the move operation and performing moving of the one or more of the file system entities that are missing in the move operation, wherein responsive to determining that the event is a delete operation on the application, the one or more automatic processor actions comprises detecting, based on the entries in the table, one or more of the file system entities that are missing in the delete operation and performing deleting of the one or more of the file system entities that are missing in the delete operation; and wherein the triggering of one or more automatic processor actions comprises obtaining one or more rules for handling the event indicative of a modification to the application, and executing the one or more rules.

2. The method of claim 1, wherein the monitoring is performed by a background process running on the processor.

3. The method of claim 1, wherein the table is stored in a memory device that is locally coupled to the device.

4. The method of claim 1, wherein the table is stored in a memory device that is remotely coupled to the device over a computer network.

5. The method of claim 1, wherein the modification comprises one or more of copy, delete, or move.

6. The method of claim 1, wherein the triggering of one or more automatic processor actions comprises accessing the table and determining which one or more of the file system entities remain unmodified after the modification to the application, and performing the modification on the one or more of the file system entities determined to remain unmodified.

7. The method of claim 1, wherein the monitoring comprising monitoring for events triggered by one or more application programming interfaces (APIs) associated with the operating system.

8. The method of claim 1, wherein the table is accessed via one or more web interfaces.

9. A computer readable storage medium storing a program of instructions executable by a machine to perform a method of an on device client that augments operating system functionality, the method comprising:

monitoring for an event from an operating system running on a processor of a device;

responsive to determining that the event is indicative of an installation of an application on the device, generating a table associated with the application, the table comprising locations of file system entities associated with the application, and storing the table in a memory device, the file system entities comprising files associated with the application, the files being components of the application needed for the application to operate as intended; and responsive to determining that the event is indicative of a modification to the application installed on the device, triggering one or more automatic processor actions to keep the modification consistent across the file system entities of the application wherein responsive to determining that the event is a copy operation on the application, the one or more automatic processor actions comprises detecting, based on entries in the table, one or more of the file system entities that are missing in the copy operation and performing copying of the one or more of the file system entities that are missing in the copy operation, wherein responsive to determining that the event is a move operation on the application, the one or more automatic processor actions comprises detecting, based on the entries in the table, one or more of the file system entities that are missing in the move operation and performing moving of the one or more of the file system entities that are missing in the move operation, wherein responsive to determining that the event is a delete operation on the application, the one or more automatic processor actions comprises detecting, based on the entries in the table, one or more of the file system entities that are missing in the delete operation and performing deleting of the one or more of the file system entities that are missing in the delete operation; and wherein the triggering of one or more automatic processor actions comprises obtaining one or more rules for handling the event indicative of a modification to the application, and executing the one or more rules.

10. The computer readable storage medium of claim 9, wherein the monitoring is performed by a background process running on the processor.

11. The computer readable storage medium of claim 9, wherein the table is stored in a memory device that is locally coupled to the device.

12. The computer readable storage medium of claim 9, wherein the table is stored in a memory device that is remotely coupled to the device over a computer network.

13. The computer readable storage medium of claim 9, wherein the modification comprises one or more of copy, delete, or move.

14. The computer readable storage medium of claim 9, wherein the triggering of one or more automatic processor actions comprises accessing the table and determining which one or more of the file system entities remain unmodified after the modification to the application, and performing the modification on the one or more of the file system entities determined to remain unmodified.

15. The computer readable storage medium of claim 9, wherein the monitoring comprising monitoring for events triggered by one or more application programming interfaces (APIs) associated with the operating system.

16. A system for an on device client that augments operating system functionality, comprising:

a device comprising at least a processor and a memory, the processor operable to run a background process to monitor for an event from an operating system running on the device, responsive to determining that the event is indicative of an installation of an application on the device, the processor is further operable to generate a table associated with the application, the table comprising locations of file system entities associated with the application, the file system entities comprising files associated with the application, the files being components of the application needed for the application to operate as intended, the processor further operable to store the table in the memory, responsive to determining that the event is indicative of a modification to the application installed on the device, the processor is further operable to trigger one or more automatic processor actions to keep the modification consistent across the file system entities of the application, wherein responsive to determining that the event is a copy operation on the application, the one or more automatic processor actions comprises detecting, based on entries in the table, one or more of the file system entities that are missing in the copy operation and performing copying of the one or more of the file system entities that are missing in the copy operation, wherein responsive to determining that the event is a move operation on the application, the one or more automatic processor actions comprises detecting, based on the entries in the table, one or more of the file system entities that are missing in the move operation and performing moving of the one or more of the file system entities that are missing in the move operation, wherein responsive to determining that the event is a delete operation on the application, the one or more automatic processor actions comprises detecting, based on the entries in the table, one or more of the file system entities that are missing in the delete operation and performing deleting of the one or more of the file system entities that are missing in the delete operation; and wherein the processor triggers the one or more automatic processor actions by obtaining one or more rules for handling the event indicative of a modification to the application, and executing the one or more rules.

17. The system of claim 16, wherein the processor triggers the one or more automatic processor actions by accessing the table and determining which one or more of the file system entities remain unmodified after the modification to the application, and performing the modification on the one or more of the file system entities determined to remain unmodified.

* * * * *